(12) United States Patent
Raheja et al.

(10) Patent No.: US 10,305,731 B2
(45) Date of Patent: May 28, 2019

(54) SYSTEM AND METHOD FOR PROVISIONING CLOUD SERVICES ACROSS HETEROGENEOUS ENVIRONMENTS USING PARTITIONED PROVISIONING INSTRUCTIONS STORED ON A CONFIGURATION MANAGEMENT SERVER

(71) Applicant: Oracle International Corporation, Redwood Shores, CA (US)

(72) Inventors: Rajesh Raheja, Cupertino, CA (US); Jonathan Fu, Dublin, CA (US); Gabor Toth, West Conshohocken, PA (US); Lay Le, San Jose, CA (US); Shiladitya Mukherjee, Bangalore Ka (IN); Maromi Panda, Bangalore Ka (IN); Zhiwen Jin, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 222 days.

(21) Appl. No.: 15/171,904

(22) Filed: Jun. 2, 2016

(65) Prior Publication Data
US 2017/0012819 A1 Jan. 12, 2017

Related U.S. Application Data

(60) Provisional application No. 62/189,614, filed on Jul. 7, 2015.

(51) Int. Cl.
*G06F 13/00* (2006.01)
*H04L 12/24* (2006.01)
(Continued)

(52) U.S. Cl.
CPC ...... *H04L 41/0806* (2013.01); *G06F 9/45558* (2013.01); *G06F 9/5072* (2013.01);
(Continued)

(58) Field of Classification Search
CPC ............ H04L 12/5695; H04L 29/06; H04L 41/0806; H04L 29/08072; H04L 29/08144;
(Continued)

(56) References Cited

U.S. PATENT DOCUMENTS

2012/0151480 A1 6/2012 Diehl
2013/0346607 A1 12/2013 Fu
(Continued)

OTHER PUBLICATIONS

Unknown, "About the chef-repo" Chef Conf 2015, Game on, Santa Clara, CA Mar. 31-Apr. 2, 2015, 8 pages, retrieved on Mar. 30, 2015 from: <https://docs.chef.io/chef_repo.html>.
(Continued)

*Primary Examiner* — Robert B Harrell
(74) *Attorney, Agent, or Firm* — Tucker Ellis LLP

(57) ABSTRACT

In accordance with an embodiment, described herein is a system and method for provisioning cloud services across heterogeneous computing environments. A plurality of provisioning instructions stored on a configuration management server can be partitioned into a plurality of ranges. A plurality of client nodes connected to the configuration management server can be configured into a plurality of groups, each group providing one or more computing environments on one or more virtual machines for hosting a cloud service. Each computing environment in a particular group can be associated with a provisioning instruction launcher that specifies a particular range of provisioning instructions. When a virtual machine in a particular group reboots, the computing environment on the virtual machine searches for the latest provisioning instruction in the range corresponding to the particular group.

18 Claims, 5 Drawing Sheets

(51) Int. Cl.
  *G06F 9/50* (2006.01)
  *G06F 9/455* (2018.01)
  *H04L 29/08* (2006.01)

(52) U.S. Cl.
  CPC ............ *G06F 9/5077* (2013.01); *H04L 67/10* (2013.01); *G06F 2009/45575* (2013.01); *G06F 2009/45595* (2013.01)

(58) Field of Classification Search
  CPC ......... H04L 29/08171; H04L 29/08981; H04L 41/12; H04L 67/10; G06F 13/00; G06F 9/5072; G06F 9/45558; G06F 9/5077; G06F 2009/45575; G06F 2009/45595

USPC ................................................ 709/220, 226
  See application file for complete search history.

(56) References Cited

U.S. PATENT DOCUMENTS

2014/0074973 A1 3/2014 Kumar
2015/0082303 A1 3/2015 Bell
2016/0094483 A1* 3/2016 Johnston ............... H04L 47/827
                                                                    709/226

OTHER PUBLICATIONS

Mitesh Soni et al., "An Overview of Automation and Advent of Chef" Packt Publishing, 8 pages, retrieved on Mar. 28, 2015 from: <https://www.packtpub.com/books/content/overview>.

Wikipedia the Free Encyclopedia "Continuous delivery", 4 pages, retrieved on Apr. 23, 2015 from: <http://en.wikipedia.org/wiki/Continuous_delivery>.

European Patent Office, International Searching Authority, International Search Report and Written Opinion dated Aug. 19, 2016 for International Application No. PCT/US2016/035788, 13 Pages.

* cited by examiner

SYSTEM AND METHOD FOR PROVISIONING CLOUD SERVICES ACROSS HETEROGENEOUS ENVIRONMENTS USING PARTITIONED PROVISIONING INSTRUCTIONS STORED ON A CONFIGURATION MANAGEMENT SERVER

CLAIM OF PRIORITY

This application claims the benefit of priority to U.S. Provisional Application titled "SYSTEM AND METHOD FOR PROVISIONING CLOUD SERVICES ACROSS HETEROGENEOUS ENVIRONMENTS", Application No. 62/189,614, filed Jul. 7, 2015, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to continuous integration and delivery of software applications, and are particularly related to a system and method for provisioning cloud services across heterogeneous environments.

BACKGROUND

In the area of software development, a paradigm shift from a waterfall approach, with monolithic releases, to an agile approach with incremental releases, has changed the way that an application life cycle is managed. For example, developers tend to integrate early and more frequently to reduce integration failures. To accommodate the requirements of increased frequency of builds, testing and deployments, a plurality of tools, such as configuration management tools, can be used for configuration management of a plurality of machines/client nodes for multiple participants in a software development process.

These tools can use multiple provisioning instructions to configure client nodes for different purposes. However, the multiple provisioning instructions that are stored on a configuration management server can cause a client node to retrieve a provisioning instruction that it does not intend to retrieve.

SUMMARY

In accordance with an embodiment, described herein is a system and method for provisioning cloud services across heterogeneous computing environments. A plurality of provisioning instructions stored on a configuration management server can be partitioned into a plurality of ranges. A plurality of client nodes connected to the configuration management server can be configured into a plurality of groups, each group providing one or more computing environments on one or more virtual machines for hosting a cloud service. Each computing environment in a particular group can be associated with a provisioning instruction launcher that specifies a particular range of provisioning instructions. When a virtual machine in a particular group reboots, the computing environment on the virtual machine searches for the latest provisioning instruction in the range corresponding to the particular group.

DETAILED DESCRIPTION

A configuration management tool (for example, Chef) can configure different types of client nodes for different purposes. For example, one type of client nodes can be configured for developers, and another type can be configured for testers. For a development team that uses the continuous integration and continuous delivery practice, the different types of client nodes can include a same set of server components, and one or more different versions of a software application under development.

However, such a configuration management tool often uses a configuration management server to store provisioning instructions, which can cause one type of client node to retrieve a provisioning instruction intended for another type of client nodes.

Further, the multiple provisioning instructions centrally stored on a configuration management server tend to provide configuration information for a particular type of computing environment. However, different participants in the software development process can be required to use heterogeneous computing environments. For example, a developer can be required to use a Windows environment for development, while a tester can be required to use a Linux environment for testing.

Existing solutions to the above-described problems include creating different servers for storing provisioning instructions for different types of client nodes. However, the multiple servers approach is not suitable for continuous integration and continuous delivery.

In accordance with an embodiment, described herein is a system and method for provisioning cloud services across heterogeneous computing environments. A plurality of provisioning instructions stored on a configuration management server can be partitioned into a plurality of ranges. A plurality of client nodes connected to the configuration management server can be configured into a plurality of groups, each group providing one or more computing environments on one or more virtual machines for hosting a cloud service. Each computing environment in a particular group can be associated with a provisioning instruction launcher that specifies a particular range of provisioning instructions. When a virtual machine in a particular group reboots, the computing environment on the virtual machine searches for the latest provisioning instruction in the range corresponding to the particular group.

Figure 1:
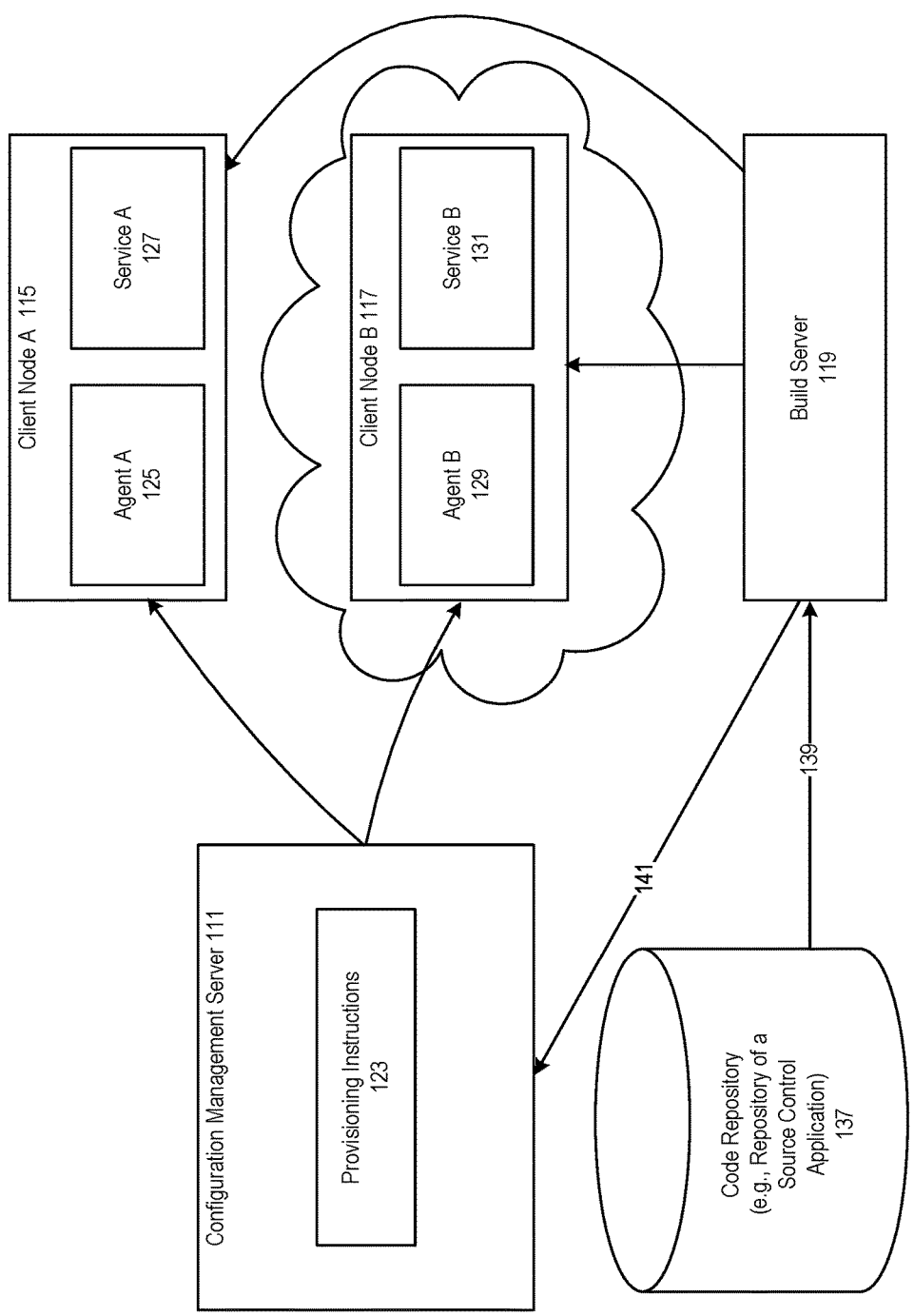
FIG. 1 illustrates a configuration management tool, in accordance with an embodiment.

FIG. 1 illustrates a configuration management tool, in accordance with an embodiment.

As shown in FIG. 1, the system can include a plurality of client nodes (for example, client node A 115, and client node B 117); and a configuration management server 111 that provides provisioning instructions 123 to the plurality of client nodes.

In accordance with an embodiment, a provisioning instruction (e.g., a set of cookbooks for Chef) can serve as a fundamental unit of configuration and policy details that the configuration management server uses to bring a client node into a specific state. For example, a provisional instruction can be used to install a web server and a database server, and to change configuration files in different computing environments, for provisioning a cloud service in those computing environments.

In accordance with an embodiment, a client node can be a physical server, or a virtual machine in a private cloud or public cloud. Each client node can include an agent (for example, agent A 125 and agent B 129) that fetches a provisioning instruction and executes the provisioning instruction to configure that client node.

In accordance with an embodiment, each agent can poll the configuration management server at a regular interval for the most recent provisioning instruction, and use the provisioning instruction to bring the client node up-to-date if the client node does not comply with the state defined by the provisioning instruction.

In accordance with an embodiment, a provisioning instruction can comprise a set of files (for example, cookbook files), and a metadata to store the versions of these files. A provisioning instruction can have a unique version number, which can represent a set of functionality different from a provisioning instruction on which the version is based.

For example, a provisioning instruction version number can take the form of X.Y.Z., where X.Y.Z. are decimal numbers used to represent major (X), minor (Y), and patch (Z) versions.

As further shown in FIG. 1, a code repository 137, for example, a database associated with a source control application/system, can be used to store different versions of source code for a software application and provisioning instructions for configuring the client nodes for use in developing, testing, or deploying the software application.

In accordance with an embodiment, a build server (for example, Jenkins) 119 can retrieve the latest changes in the source code of the software, and perform an automated build to generate a plurality of builds, either at a regular interval, for example, nightly, or whenever code changes are detected. The build server can take the builds, and use a deployment process invoked by the agent on each client node to deploy one or more builds on that client node.

In accordance with an embodiment, a different version of the software application can be deployed for execution on each node. For example, each of service A 127 and service B 131 can represent a different version of the software application. A provisioning instruction assigned to each client node can be used to bring that client node to a desired state for execution of a particular version of the software application.

As shown in FIG. 1, the code repository can be connected 139 to the build server, which in turn can be connected 141 to the configuration management server. Whenever there is a code change in the code repository, one or more automated processes in the build server or the configuration management server can be triggered to install code packages in the builds on the client nodes.

In accordance with an embodiment, the plurality of client nodes can be configured to be used by users of different roles in the software development process. Each client node, whether it is a development node or a testing node, can use the same computing environment, in which a different version of a software application for a cloud service can be provisioned. To configure the client nodes as described above, multiple versions of provisioning instructions can be used, with each version defining a same server state and a different version of the software application.

However, when a client node of any type reboots, it can search for the latest version of the provisioning instruction. For example, if the provisioning instruction has been updated to accommodate a change that a developer has made, a testing client node can retrieve the latest version of the provisioning instruction, even if a tester may not be yet ready to test the latest version of the software application.

Version Number Partitioning for Provisioning Instructions

Figure 2:
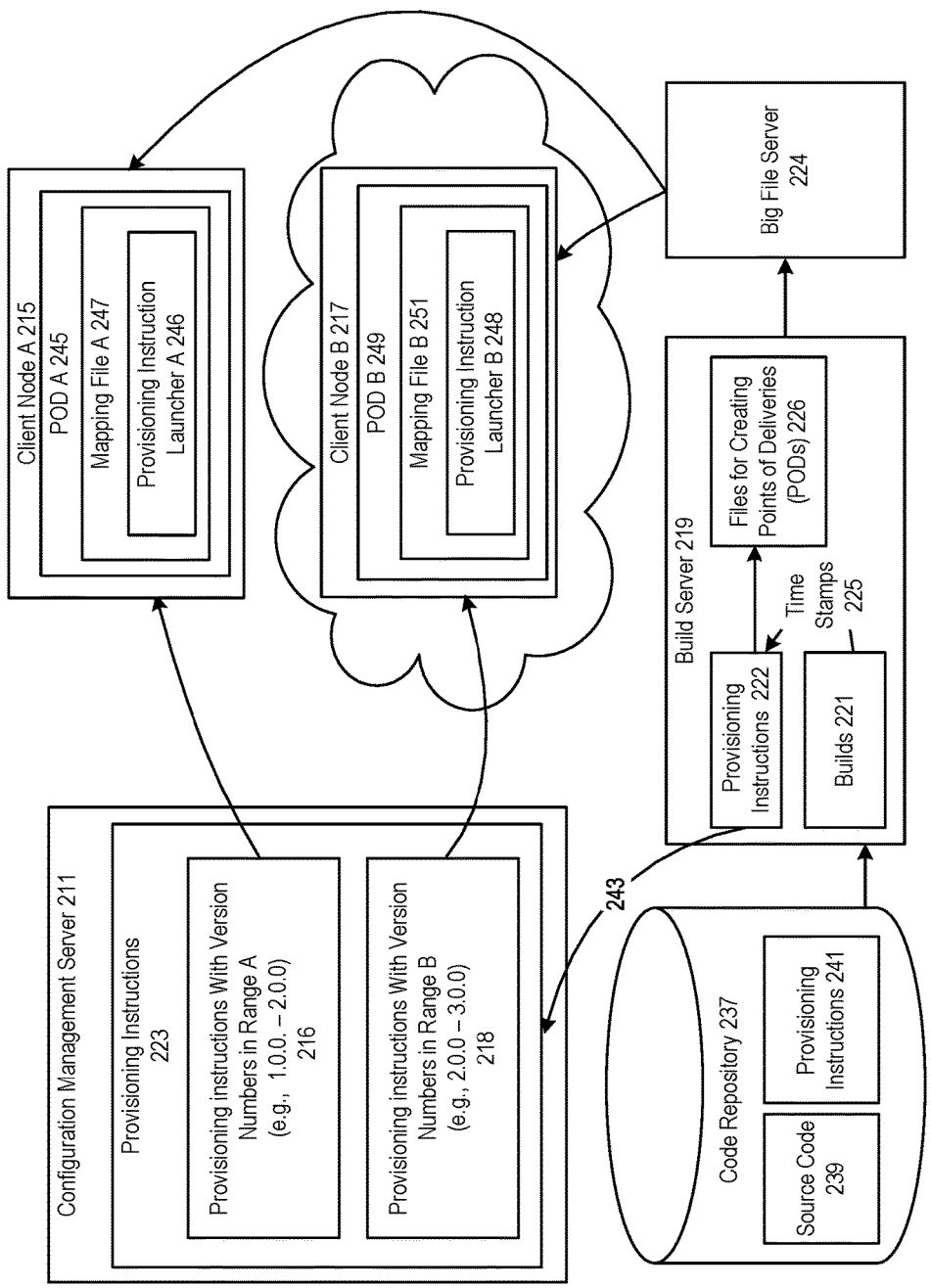
FIG. 2 illustrates a system for provisioning cloud services across heterogeneous computing environments, in accordance with an embodiment.

FIG. 2 illustrates a system for provisioning cloud services across heterogeneous computing environments, in accordance with an embodiment.

More particularly, FIG. 2 shows a system that can be used to overcome the above-described problems, by partitioning version numbers of provisioning instructions into different ranges, with each range assigned to one or more client nodes of a particular type, for example, one or more testing client nodes, or one or more development client nodes.

In accordance with an embodiment, each type of client nodes can be used by users of a particular role in the software development process, and can be partitioned into different groups. For example, development client nodes can be in one group, and testing client nodes can in a different group, for easy identification.

As shown in FIG. 2, a build server 219 can be configured to automatically generate a plurality of builds 221 at a regular interval (for example, hourly or nightly) using source code 239 from a code repository 237. Each build can have a build label that comprises four parts: a label name, a date, a time, and a build number.

For example, in the build label "SOACLOUD_MAIN_GENERIC_141017_1145_0219", "SOACLOUD_MAIN_GENERIC" is the label name, the numeric values indicate that the build was generated at 11:45 PM on Oct. 17, 2014, and "0219" is the build number.

In accordance with an embodiment, each build can be associated with a provisioning instruction retrieved from provisioning instructions 241 stored in the code repository. Version numbers of the provisioning instructions can be partitioned into a plurality of ranges. Each range can include one or more provisioning instructions for configuring one or more client nodes of a particular type.

In accordance with an embodiment, a range can be identified by a category indicator, which can be a numerical value for the major version in a version number of a provisioning instruction.

As an illustrative example, the version numbers of the provisioning instructions can be partitioned into a range for developers and a range for testers. The range for developers can comprise any provisioning instruction with a version number smaller than 2.0.0, and bigger than 1.0.0.

In accordance with an embodiment, the version number of the provisioning instruction associated with a build can be updated with the date and time information from the build label, to match the build with the provisioning instruction.

As an illustrative example, a provisioning instruction retrieved from the code repository can have the version number "1.1.1", where the first "1" is a category indicator that this version of the provisioning instruction is created for use by a development node, the middle "1" is a minor version, and the last "1" is a patch version.

In accordance with an embodiment, the build server can modify a metadata used for storing the version number of the provisioning instruction, to replace the minor version and the patch version, respectively with the date and time extracted from the build label.

For example, after the update, the version number of the provisioning instruction becomes "1.141017.1145", which includes the original category indicator, and the date and time extracted from the build label "SOACLOUD_MAIN_GENERIC_141017_1145_0219".

As shown in FIG. 2, provisioning instruction 222 can be created from a plurality of the provisioning instructions in the code repository, by using time stamps 225 from the plurality of builds in accordance with the method described above. The provisioning instructions that are partitioned into different ranges can be uploaded 243 from the build server to a configuration management server 211, where provisioning instructions 223 can include versions numbers in range A 216 and range B 218.

Points of Delivery (POD)

In accordance with an embodiment, the build server can include a plurality of files 226 for creating a plurality of points of deliveries (PODs), each POD representing a computing environment for rendering one or more builds as a cloud service.

As used herein, a POD can be a deployable or hosting unit on which a service (for example, a cloud service) can be installed. For example, a POD can comprise one or more application containers, shared storage for the containers, and options about how to run the containers. A POD can be a virtual machine, or created from a virtual machine.

As further shown in FIG. 2, each of the plurality of files on the build server can be assigned an updated version number of a provisioning instruction as a postfix. The plurality of files can be subsequently uploaded to a big file server 224, together with each of the builds.

In accordance with an embodiment, multiple PODs can be created from the plurality of files, and can be uploaded to a plurality of client nodes (for example, client node A 215 and client node B 217).

For example, POD A 245 can be uploaded to client Node A, and POD B 249 can be uploaded to client node B.

In accordance with an embodiment, each POD can include a mapping file (for example, mapping file A 247 or mapping file B 251), and each mapping file can specify a provisioning instruction launcher (for example, provisioning instruction launcher A 246 and provisioning instruction launcher B 248). Each provisioning instruction launcher can be a file (for example, a cookbook file) used by an agent in a client node to launch the latest provisioning instruction within a particular range.

For example, provisioning instruction launcher A can be used to launch the latest provisioning instruction within the range A, and provisioning instruction launcher B can be used to launch the latest provisioning instruction within the range B.

In accordance with an embodiment, whenever a particular client node is rebooted, the provisioning instruction launcher on the client node can search for a provisioning instruction with a highest (latest) version number with a particular range.

In accordance with an embodiment, by partitioning the version numbers of the provisioning instructions into different ranges, each range tied to a particular type of client nodes, the system allows the configuration management server to store provisioning instructions for a plurality of client nodes, for use by users of different roles in the software development process.

In accordance with an alternative embodiment, during the creation of a POD, the mapping file of the POD can be used to pin down to a specific version of a provisioning instruction. For example, the mapping file can explicitly specify which version of a provisioning instruction to use. When the POD is stopped or restarted, the specified version of the provisioning instruction can be searched for, even if a newer or older version is available on the configuration management server. If the specified version is not available, an error can be generated.

Figure 3:
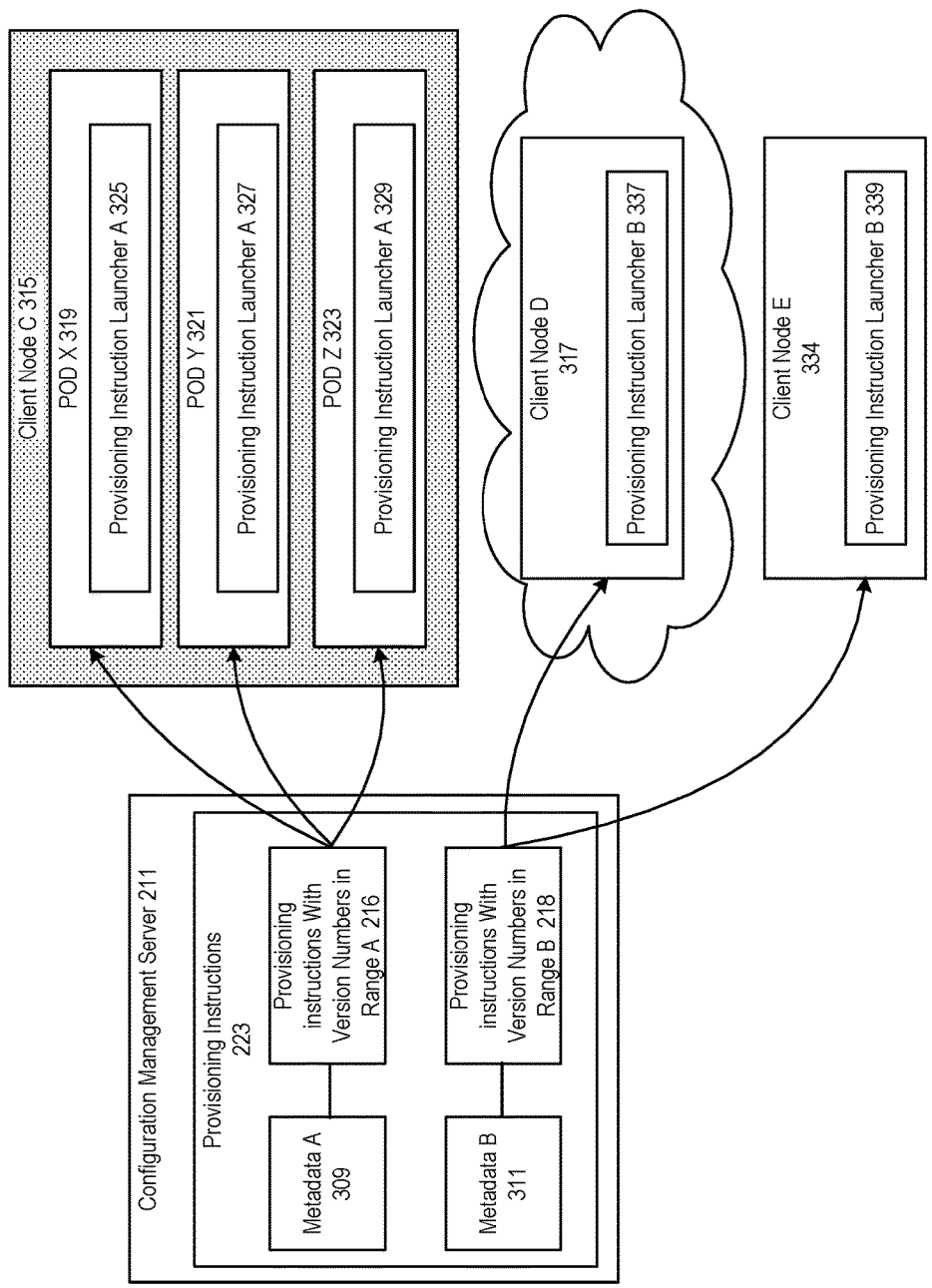
FIG. 3 further illustrates a system for provisioning cloud services across heterogeneous computing environments, in accordance with an embodiment.

FIG. 3 further illustrates a system for provisioning cloud services across heterogeneous computing environments, in accordance with an embodiment.

More particularly, FIG. 3 illustrates different types of computing environments provided by one client node, or a plurality of client nodes.

In accordance with an embodiment, when developing and testing a cloud service, a development team can use a particular version of a software application for a given POD. Each POD can be associated with a different computing environment, including hardware and operating systems. Virtualization solutions (for example, Vagrant Box) allow a user to simulate different computing environments using virtualization on a client node.

As shown in FIG. 3, client Node C 315 can provide a Vagrant box environment, in which a plurality of PODs can be installed, for example, POD X 319 for Windows, POD Y 321 for Linux, and POD Z 323 for Ubuntu. Each POD can be a virtual machine (for example, a Vagrant box), and can include a common provisioning provision launcher, for example, provisioning launcher A 325, 327 or 329 in the PODs.

In accordance with an embodiment, the plurality of PODs allow a developer to develop or test a cloud service in a plurality of computing environments using the same provisioning instruction.

In accordance with an embodiment, each range of provisioning instructions stored on the configuration management server can be associated with a metadata (for example, metadata A 309 and metadata B 311). The metadata can be used to configure or customize a same provisioning instruction for use by a plurality of different computing environments on one client node, or across a plurality of client nodes.

In accordance with an embodiment, a provisioning instruction in range A can be used to bring each of the plurality of computing environments on client node C, to a desired state defined by the provisioning instruction. Metadata A can include information to customize the provisioning instruction to meet the specific requirements of each computing environment on client node C.

Similarly, metadata B can provide information to customize a provisioning instruction in range B, to meet the specific requirements of each of a plurality of different computing environments on different client nodes of a particular type, for example, client node D 317 and client node E 334.

In accordance with an embodiment, when a POD on client node C reboots, it can invoke the provisioning instruction launcher A to search the latest provisioning instruction within range A. When each of client node D and client node E reboots, it can invoke a same provisioning instruction launcher (for example, provisioning instruction launcher B 337 or 339) to search for the latest provisioning instruction in range B.

Figure 4:
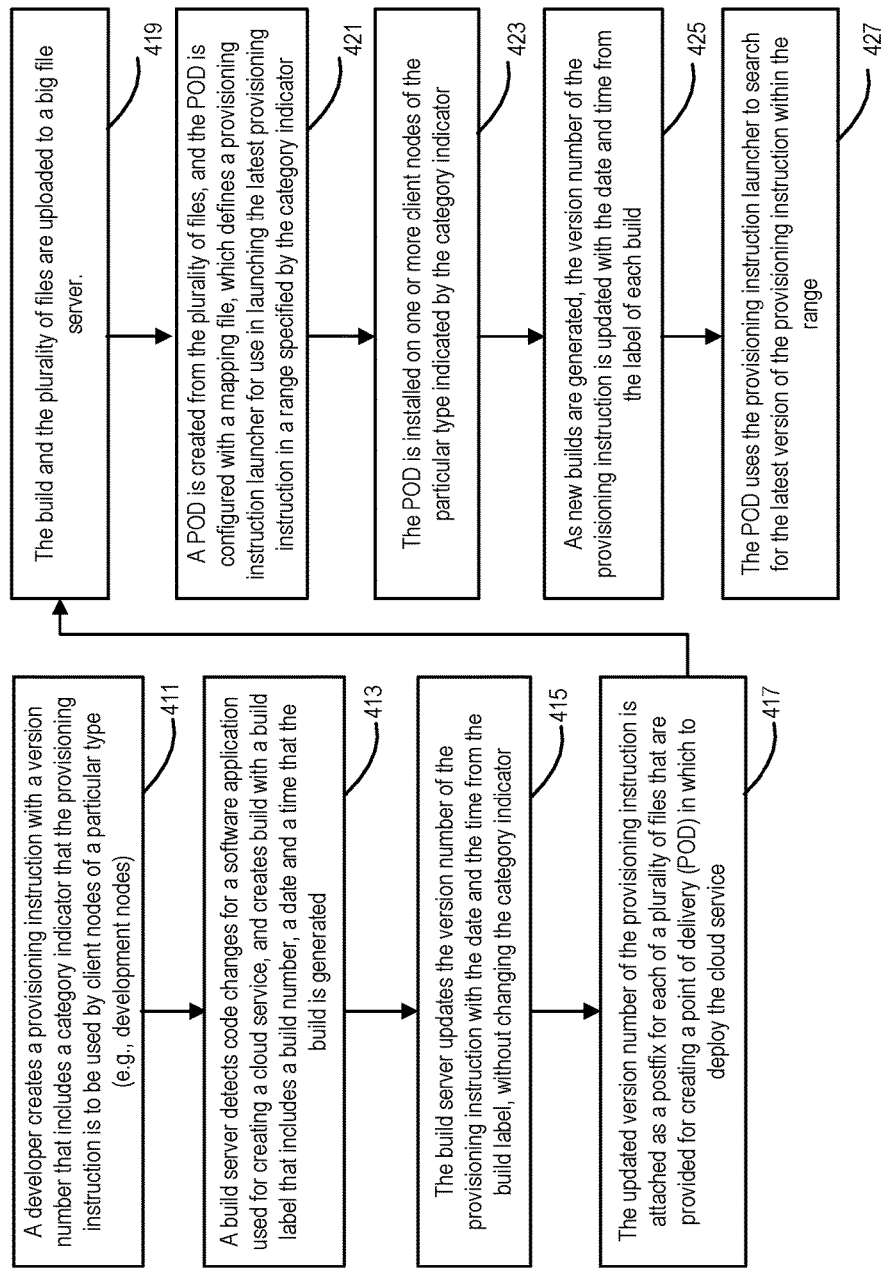
FIG. 4 illustrates a flow chart for provisioning cloud services across heterogeneous environments by partitioning version numbers of provisioning instructions, in accordance with an embodiment.

FIG. 4 illustrates a flow chart for provisioning cloud services across heterogeneous environments by partitioning version numbers of provisioning instructions, in accordance with an embodiment.

In accordance with an embodiment, at step 411, a developer creates a provisioning instruction with a version number that includes a category indicator that the provisioning instruction is to be used by client nodes of a particular type (e.g., development nodes).

As step 413, a build server detects code changes for a software application used for creating a cloud service, and creates a build with a build label that includes a build number, a date and a time that the build is generated.

At step 415, the build server updates the version number of the provisioning instruction with the date and the time from the build label, without changing the category indicator.

At step 417, the updated version number of the provisioning instruction is attached as a postfix for each of a plurality of files that are provided for creating a point of delivery (POD) in which to deploy the cloud service.

At step 419, the build and the plurality of files are uploaded to a big file server.

At step 421, a POD is created from the plurality of files, and the POD is configured with a mapping file, which defines a provisioning instruction launcher for use in launching the latest provisioning instruction in a range specified by the category indicator.

At step 423, the POD is installed on one or more client nodes of the particular type indicated by the category indicator.

At step 425, as new builds are generated, the version number of the provisioning instruction is updated with the date and time from the label of each build.

At step 427, the POD uses the provisioning instruction launcher to search for the latest version of the provisioning instruction within the range.

Figure 5:
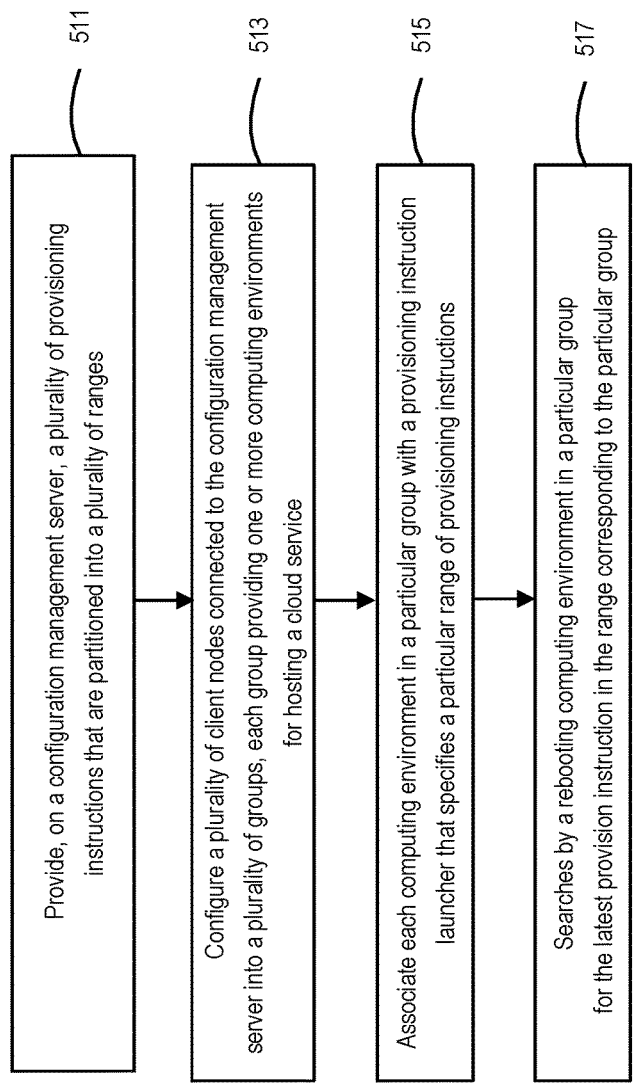
FIG. 5 illustrates a method for provisioning cloud services across heterogeneous computing environments, in accordance with an embodiment.

FIG. 5 illustrates a method for provisioning cloud services across heterogeneous computing environments, in accordance with an embodiment.

As shown in FIG. 5, at step 511, a plurality of provisioning instructions that are partitioned into a plurality of ranges are provided on a configuration management server that is connected to a plurality of client nodes.

At step 513, the plurality of client nodes are configured into a plurality of groups, each group providing one or more computing environments for hosting a cloud service.

At step 515, each computing environment in a particular group is associated with a provisioning instruction launcher that specifies a particular range of provisioning instructions.

At step 517, when rebooting, a computing environment in a particular group searches for the latest provisioning instruction in the range corresponding to the particular group.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for provisioning cloud services across heterogeneous computing environments, comprising:

a computer comprising a processor;

a configuration management server, executing on the computer by the processor, the configuration management server storing a plurality of provisioning instructions partitioned into a plurality of ranges, the plurality of provisioning instructions comprising a first plurality of provisioning instructions partitioned in a first range of provisioning instruction versions and a second plurality of provisioning instructions partitioned in a second range of provisioning instruction versions, the first plurality of provisioning instructions partitioned in the first range of provisioning instruction versions being different than the second plurality of provisioning instructions partitioned in the second range of provisioning instruction versions; and a plurality of different types of client nodes configured into a plurality of groups, wherein each group corresponds to a one of the plurality of different types of client nodes, wherein each group provides one or more heterogeneous computing environments on one or more virtual machines for hosting a cloud service, and wherein each type of client node can be used by associated users of the system having different user roles, wherein a first group of the plurality of groups of different types of client nodes is associated with a first provisioning instruction launcher specifying the first range of provisioning instruction versions for use in configuring the one or more heterogeneous computing environments in the first group, wherein a second group of the plurality of groups of different types of client nodes is associated with a second provisioning instruction launcher specifying the second range of provisioning instruction versions for use in configuring the one or more heterogeneous computing environments in the second group, wherein when a first virtual machine in the first group restarts, a computing environment on the first virtual machine searches the configuration management server by the first provisioning instruction launcher for a latest provisioning instruction of the first plurality of provisioning instructions in the first range of provisioning instruction versions specified by the first provisioning instruction launcher associated with the first group, whereby the first virtual machine uses only provisioning instructions on the configuration management server in the first range of provisioning instruction versions and does not use provisioning instructions on the configuration management server in the second range of provisioning instruction versions intended for a second virtual machine in the second group, wherein when the second virtual machine in the first group restarts, a computing environment on the second virtual machine searches the configuration management server by the second provisioning instruction launcher for a latest provisioning instruction of the second plurality of provisioning instructions in the second range of provisioning instruction versions specified by the second provisioning instruction launcher associated with the second group, whereby the second virtual machine uses only provisioning instructions on the configuration management server in the second range of provisioning instruction versions and does not use provisioning instructions on the configuration management server in the first range of provisioning instruction versions intended for the first virtual machine in the first group.

2. The system of claim 1, further comprising
a build server configured to generate a plurality of builds, each build comprising a build label, and associated with a provisioning instruction; and
a plurality of points of delivery (PODs), each POD comprising a virtual machine and installed in a particular computing environment for provisioning the cloud service.

3. The system of claim 2, wherein the version number of the provisioning instruction is updated with a date and a time from a build label of the build.

4. The system of claim 3, wherein the updated provision number is uploaded to the configuration management server.

5. The system of claim 2, wherein the provisioning instruction associated with each build includes a version number, which contains a category indicator specifying that the provisioning instruction is provided for use by a particular group of client nodes.

6. The system of claim 1, wherein the plurality of provisioning instructions are partitioned based on a category of the corresponding client nodes and, within the partition based on their version numbers.

7. The system of claim 1, wherein each range of provisioning instructions is associated with a metadata for use in configuring or customizing a provisioning instruction within that range for different computing environments in a particular group of client nodes.

8. The system of claim 1, wherein the configuration management server is a Chef server or a Puppet server, and wherein each provisioning instruction is a cookbook.

9. A method for provisioning cloud services across heterogeneous computing environments, comprising:

providing, on a configuration management server, a plurality of provisioning instructions that are partitioned into a plurality of ranges the plurality of provisioning instructions comprising a first plurality of provisioning instructions partitioned in a first range of provisioning instruction versions and a second plurality of provisioning instructions partitioned in a second range of provisioning instruction versions, the first plurality of provisioning instructions partitioned in the first range of provisioning instruction versions being different than the second plurality of provisioning instructions partitioned in the second range of provisioning instruction versions;

configuring a plurality of different types of client nodes connected to the configuration management server into a plurality of groups, wherein each group corresponds to a one of the plurality of different types of client nodes, wherein each group providing one or more heterogeneous computing environments for hosting a cloud service, and wherein each type of client node can be used by associated users of the system having different user roles;

associating a first group of the plurality of groups of different types of client nodes with a first provisioning instruction launcher that specifies the first range of provisioning instruction versions for use in configuring the one or more heterogeneous computing environments in that the first group; and associating a second group of the plurality of groups of different types of client nodes with a second provisioning instruction launcher specifying the second range of provisioning instruction versions for use in configuring the one or more heterogeneous computing environments in the second group, wherein when a first virtual machine in the first group restarts, a computing environment on the first virtual machine searches the configuration management server by the first provisioning instruction launcher for a latest provisioning instruction of the first plurality of provisioning instructions in the first range of provisioning instruction versions specified by the first provisioning instruction launcher associated with the first group, whereby the first virtual machine uses only provisioning instructions on the configuration management server in the first range of provisioning instruction versions and does not use provisioning instructions on the configuration management server in the second range of provisioning instruction versions intended for a second virtual machine in the second group, wherein when the second virtual machine in the first group restarts, a computing environment on the second virtual machine searches the configuration management server by the second provisioning instruction launcher for a latest provisioning instruction of the second plurality of provisioning instructions in the second range of provisioning instruction versions specified by the second provisioning instruction launcher associated with the second group, whereby the second virtual machine uses only provisioning instructions on the configuration management server in the second range of provisioning instruction versions and does not use provisioning instructions on the configuration management server in the first range of provisioning instruction versions intended for the first virtual machine in the first group.

10. The method of claim 9, further comprising
configuring a build server to generate a plurality of builds, each build comprising a build label, and associated with a provisioning instruction; and
creating a plurality of points of delivery (PODs), each POD comprising a virtual machine and installed in a particular computing environment for provisioning the cloud service.

11. The method of claim 10, wherein the version number of the provisioning instruction is updated with a date and a time from a build label of the build.

12. The method of claim 11, wherein the updated provision number is uploaded to the configuration management server.

13. The method of claim 10, wherein the provisioning instruction associated with each build includes a version number, which contains a category indicator specifying that the provisioning instruction is provided for use by a particular group of client nodes.

14. The method of claim 9, wherein the plurality of provisioning instructions are partitioned based on a category of the corresponding client nodes and, within the partition based on their version numbers.

15. The method of claim 9, wherein each range of provisioning instructions is associated with a metadata to configure or customize a provisioning instruction within that range for the plurality of different computing environments in a particular group of client nodes.

16. The method of claim 9, wherein the configuration management server is a Chef server or a Puppet server, and wherein each provisioning instruction is a Cookbook.

17. A non-transitory computer-readable storage medium storing a set of instructions for provisioning cloud services across heterogeneous computing environments, said instructions, when executed by a processor, causing the processor to perform the steps comprising:
providing, on a configuration management server, a plurality of provisioning instructions that are partitioned into a plurality of ranges, the plurality of provisioning instructions comprising a first plurality of provisioning instructions partitioned in a first range of provisioning instruction versions and a second plurality of provisioning instructions partitioned in a second range of provisioning instruction versions, the first plurality of provisioning instructions partitioned in the first range of provisioning instruction versions being different than the second plurality of provisioning instructions partitioned in the second range of provisioning instruction versions;
configuring a plurality of different types of client nodes connected to the configuration management server into a plurality of groups, wherein each group corresponds to a one of the plurality of different types of client nodes, wherein each group providing one or more heterogeneous computing environments for hosting a cloud service, and wherein each type of client node can be used by associated users of the system having different user roles;
associating a first group of the plurality of groups of different types of client nodes with a first provisioning instruction launcher that specifies the first range of provisioning instruction versions for use in configuring the one or more heterogeneous computing environments in the first group; and
associating a second group of the plurality of groups of different types of client nodes with a second provisioning instruction launcher specifying the second range of provisioning instruction versions for use in configuring the one or more heterogeneous computing environments in the second group, wherein when a first virtual machine in the first group restarts, a computing environment on the first virtual machine searches the configuration management server by the first provisioning instruction launcher for a latest provisioning instruction of the first plurality of provisioning instructions in the first range of provisioning instruction versions specified by the first provisioning instruction launcher associated with the first group, whereby the first virtual machine uses only provisioning instructions on the configuration management server in the first range of provisioning instruction versions and does not use provisioning instructions on the configuration management server in the second range of provisioning instruction versions intended for a second virtual machine in the second group,
wherein when the second virtual machine in the first group restarts, a computing environment on the second virtual machine searches the configuration management server by the second provisioning instruction launcher for a latest provisioning instruction of the second plurality of provisioning instructions in the second range of provisioning instruction versions specified by the second provisioning instruction launcher associated with the second group, whereby the second virtual machine uses only provisioning instructions on the configuration management server in the second range of provisioning instruction versions and does not use provisioning instructions on the configuration management server in the first range of provisioning instruction versions intended for the first virtual machine in the first group.

18. The non-transitory computer-readable storage medium of claim 17, wherein the plurality of provisioning instructions are partitioned based on a category of the corresponding client nodes and, within the partition based on their version numbers.

* * * * *